US012593248B2

(12) United States Patent
Huang et al.

(10) Patent No.: US 12,593,248 B2
(45) Date of Patent: *Mar. 31, 2026

(54) INFORMATION TRANSMISSION METHOD AND DEVICE

(71) Applicant: ZTE CORPORATION, Shenzhen (CN)

(72) Inventors: Ying Huang, Shenzhen (CN); Lin Chen, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/417,980

(22) Filed: Jan. 19, 2024

(65) Prior Publication Data

US 2024/0349122 A1     Oct. 17, 2024

Related U.S. Application Data

(63) Continuation of application No. 17/123,975, filed on Dec. 16, 2020, now Pat. No. 11,917,452, which is a continuation of application No. PCT/CN2019/092323, filed on Jun. 21, 2019.

(30) Foreign Application Priority Data

Jun. 21, 2018     (CN) .......................... 201810646837.1

(51) Int. Cl.
| | |
|---|---|
| *H04W 28/12* | (2009.01) |
| *H04W 24/10* | (2009.01) |
| *H04W 28/02* | (2009.01) |
| *H04W 28/10* | (2009.01) |

(52) U.S. Cl.
CPC ........... *H04W 28/12* (2013.01); *H04W 24/10* (2013.01); *H04W 28/0231* (2013.01); *H04W 28/0278* (2013.01); *H04W 28/10* (2013.01)

(58) Field of Classification Search
CPC . H04W 28/12; H04W 24/10; H04W 28/0231; H04W 28/0278; H04W 28/10
See application file for complete search history.

(56) References Cited

U.S. PATENT DOCUMENTS

| | | |
|---|---|---|
| 2017/0006499 A1 | 1/2017 | Hampel et al. |
| 2017/0006579 A1 | 1/2017 | Kikuma et al. |
| 2019/0297555 A1 | 9/2019 | Hampel et al. |

(Continued)

FOREIGN PATENT DOCUMENTS

| | | |
|---|---|---|
| CN | 110366206 A | 10/2019 |
| CN | 112335192 A | 2/2021 |

(Continued)

OTHER PUBLICATIONS

AT&T, "On backhauling of F1-U and F1-C for IAB with L2 relaying" 3GPP TSG-RAN WG3 #99bis, R3-182297, Apr. 16, 2018, Sanya, China (7 pages).

(Continued)

*Primary Examiner* — Ashley Shivers
(74) *Attorney, Agent, or Firm* — Foley & Lardner LLP

(57) ABSTRACT

Provided are an information transmission method and device. The method includes that: an Integrated Access and Backhaul Links (IAB) node transmits link information to a second IAB node, wherein the second IAB node is an IAB child node or an IAB parent node or an IAB donor. Also provided are an electronic device and a storage medium.

12 Claims, 3 Drawing Sheets

A first IAB node determines link information to be transmitted ⟋ S402

The first IAB node transmits the link information to a second IAB node, wherein the second IAB node is an IAB child node or an IAB parent node or an IAB donor ⟋ S404

(56) References Cited

U.S. PATENT DOCUMENTS

| | | |
|---|---|---|
| 2019/0357117 A1 | 11/2019 | Cudak et al. |
| 2020/0007223 A1 | 1/2020 | Zhu et al. |
| 2021/0258832 A1 | 8/2021 | Teyeb et al. |
| 2021/0282050 A1 | 9/2021 | Adjakple et al. |

FOREIGN PATENT DOCUMENTS

| | | |
|---|---|---|
| JP | 2015-177497 A | 10/2015 |
| JP | 2018-525874 A | 9/2018 |
| WO | WO-2017/004253 A1 | 1/2017 |
| WO | WO-2018/063892 A1 | 4/2018 |
| WO | WO-2019/246350 A1 | 12/2019 |

OTHER PUBLICATIONS

CATT: "User Plane Considerations for L2 IA B Architectures" 3GPP TSG-RAN WG2#102; R2-1807555; May 25, 2018; Busan, South Korea (5 pages).

Communication pursuant to Article 94(3) EPC for EP App. No. 19822413.1 dated Nov. 14, 2023 (8 pages).

Extended European Search Report for EP Appl. No. 19822413.1, dated Nov. 8, 2021 (11 pages).

First Office Action for JP Appl. No. 2020-570889, dated Dec. 13, 2021 (with English translation, 6 pages).

First Office Action for KR Appl. No. 10-2021-7001766, dated Aug. 22, 2022 (with English translation, 10 pages).

Huawei et al., "Topology type, discovery and update for IAB", 3GPP TSG-RAN WG2 Meeting #102, R2-1808668, May 25, 2018, Busan, Korea (5 pages).

Huawei et al.: "Adaptation layer based L2 relaying and light L2 relaying" 3GPP TSG-RAN WG2 #99bis; R3-181999; Apr. 20, 2018; Sanya, China (9 pages).

Huawei, "Support of multiple connectivity for IAB" 3GPP TSG-RAN WG2#102, R2-1808644, May 21, 2018, Busan, Korea (3 pages).

Huawei, "UP protocol design for architecture 1a" 3GPP TSG-RAN WG3 #100, R3-183182, May 21, 2018, Busan, Korea (6 pages).

Huawei, et al., "Flexible length BSR format," 3GPP TSG-RAN WG2 NR #99; R2-1707721; Aug. 21-25, 2017; Berlin, Germany (5 pages).

Intel Corporation: "Adaptation layer and Routing for IAB in NR", R3-183169: 3GPP TSG RAN WG3 Meeting #100, May 25, 2018 (May 25, 2018), Busan, Korea (6 pages).

International Search Report and Written Opinion for PCT Appl. No. PCT/CN2019/092323 Sep. 20, 2019 (with English translation, 8 pages).

Office Action on JP Appl. No. 2020-570889 dated Sep. 9, 2022 (with English translation, 5 pages).

Qualcomm Inc.: "IAB-NSA"; R3-183563: 3GPP TSG RAN WG3 Meeting #100, May 25, 2018 (May 25, 2018), Busan, Korea (7 pages).

Qualcomm Incorporated (Rapporteur): "IAB U-plane considerations for architecture group 1" 3GPP TSG-RAN WG2 Meeting #101bis; R2-1806456; Apr. 20, 2018; Sanya, China (5 pages).

Qualcomm Incorporated: "IAB intra-donor U-plane transport for architecture group 1" 3GPP TSG-RAN WG3 Meeting #100; R3-183111; May 25, 2018; Busan, South Korea (7 pages).

Second Office Action on CN Appl. No. 201810646837.1 dated Jan. 28, 2023 (with English translation, 13 pages).

Second Office Action on KR Appl. No. 10-2021-7001766, dated Feb. 3, 2023 (with English translation, 10 pages).

ZTE: "Consideration on RLC QRQ in IAB," 3GPP TSG-RAN WG2 Meeting #102; R2-1807396; May 21-25, 2018; Busan, Korea (8 pages).

A first IAB node determines link information to be transmitted — S402

The first IAB node transmits the link information to a second IAB node, wherein the second IAB node is an IAB child node or an IAB parent node or an IAB donor — S404

AL: Adaptation Layer

AL: Adaptation layer

INFORMATION TRANSMISSION METHOD AND DEVICE

CROSS-REFERENCE TO RELATED APPLICATIONS

This application claims benefit of priority under 35 U.S.C. § 120 as a continuation of U.S. Non-Provisional application Ser. No. 17/123,975, filed Dec. 16, 2020, now U.S. Pat. No. 11,917,452 B2, which is a continuation of International Patent Application No. PCT/CN2019/092323, filed Jun. 21, 2019, which claims priority to Chinese Patent Application No. 201810646837.1, filed before the China National Intellectual Property Administration (CNIPA) on Jun. 21, 2018, the disclosure of each of which are hereby incorporated by reference in its entirety.

TECHNICAL FIELD

The disclosure relates to the field of communications, and in particular to an information transmission method and device.

BACKGROUND

In a relevant art, compared with Long Term Evolution (LTE), New Radio (NR) uses a larger available bandwidth, a Massive Multiple-Input Multiple-Output (massive MIMO) and a multi-beam, such that the researches and applications of Integrated Access and Backhaul Links (IAB) become possible. By means of wireless backhaul links and relay links, dense NR cell networks can be deployed more flexibly without having to correspondingly increasing the deployment density of transmission networks. An access node that supports wireless access of User Equipment (UE) and back-hauls a User Plane (UP) or Control Plane (CP) data packet wirelessly is referred to as an IAB node. An access node that provides a wireless backhauling function for an IAB node such that the UE is connected to a core network is referred as an IAB donor. The IAB node (which may also be referred to as a child IAB node, or an IAB child node) may be accessed to another IAB node (which may also be referred to as a parent IAB node, or an IAB parent node) or accessed to the IAB donor. The IAB node may have a Mobile Terminal (MT) logical function which may also be referred to as a UE logical function. The IAB node may also have functions of a Distributed Unit (DU) or a base station. The access nodes may transmit the UP or CP data packet between each other by a wireless backhaul link. The access link and the backhaul link may use the same carrier frequency or different carrier frequencies. In addition, the UP or CP data packet may be transmitted through a multi-hop relay back-haul link between the access node and the core network element. FIG. 1 is a schematic diagram of an IAB scenario in which a (Centralized Unit) CU/DU is not separately deployed according to the relevant art. As illustrated in FIG. 1, the uplink data packet of the UE may be transmitted to the IAB donor through two IAB nodes, and then transmitted to the 5th Generation (5G) Next Generation Core (NGC). On the other hand, it is an important technical feature in the NR to support the separate deployment of the CU/DU, i.e., the 5G gNB is composed of CU and DU logical functions. FIG. 2 is a schematic diagram of an IAB scenario in which a CU/DU is separately deployed according to the relevant art. Besides, the CU may further be composed of CP (which may also be referred to as a CU-CP) and UP (which may also be referred to as a CU-UP) logical functions. Concerning the problem that there is no link information reporting solution suitable for an IAB scenario in the NR in the relevant art, no effective solution has been pushed forward till now.

SUMMARY

Embodiments of the present disclosure provide an information transmission method and device, which may at least solve the problem that there is no link information reporting solution suitable for an IAB scenario in NR in the relevant art.

According to one embodiment of the present disclosure, an information transmission method is provided, which may include that: a first IAB node transmits link information to a second IAB node, wherein the second IAB node is an IAB child node or an IAB parent node or an IAB donor.

According to another embodiment of the present disclosure, an information transmission device is provided, which may include: a first determination module, configured to determine link information to be transmitted to a second IAB node; and a first transmitting module, configured to transmit the link information to the second IAB node, wherein the second IAB node is an IAB child node or an IAB parent node or an IAB donor.

According to still another embodiment of the present disclosure, a storage medium is further provided. The storage medium stores a computer program; and the computer program is configured to execute, when running, any operation in the method embodiment.

According to still another embodiment of the present disclosure, an electronic device is further provided, which includes a memory and a processor; the memory stores a computer program; and the processor is configured to run the computer program to execute any operation in the method embodiment.

BRIEF DESCRIPTION OF THE DRAWINGS

The accompanying drawings are described here to provide a deeper understanding of the present disclosure, and form a part of the present disclosure. The schematic embodiments and description of the present disclosure are adopted to explain the present disclosure, and do not form improper limits to the present disclosure. In the drawings.

DETAILED DESCRIPTION OF THE EMBODIMENTS

The disclosure is described below in detail with reference to the accompanying drawings and in combination with the embodiments. It is to be noted that the embodiments of the present disclosure and the characteristics of the embodiments may be combined with each other if there is no conflict.

It should be noted that, terminologies such as "first" and "second" in the specification, claims and accompanying drawings of the present disclosure are only used to distinguish similar objects, rather than to describe a special order or a precedence order.

Embodiment 1

The embodiment of the present disclosure provides a mobile communication network (including but not limited to a 5G mobile communication network). A network architecture of the network may include a network side device (such as a base station) and a terminal. The embodiment provides an information transmission method capable of being implemented based on the network architecture. It is to be noted that an implementation environment of the information transmission method provided in the embodiment of the present disclosure is not limited to the above network architecture.

Figure 3:
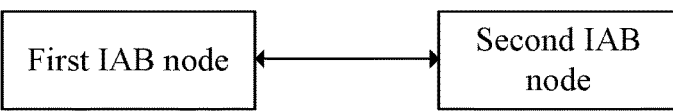
FIG. 3 is a schematic diagram of an information transmission method according to an embodiment of the present disclosure.

The embodiment of the present disclosure may be implemented based on the network architecture shown in FIG. 3. FIG. 3 is a schematic diagram of an information transmission method according to an embodiment of the present disclosure. As shown in FIG. 3, the network architecture may include: A, a first IAB node (hereinafter the first IAB node may also be referred to as an IAB node), and B, a second IAB node.

Figure 4:
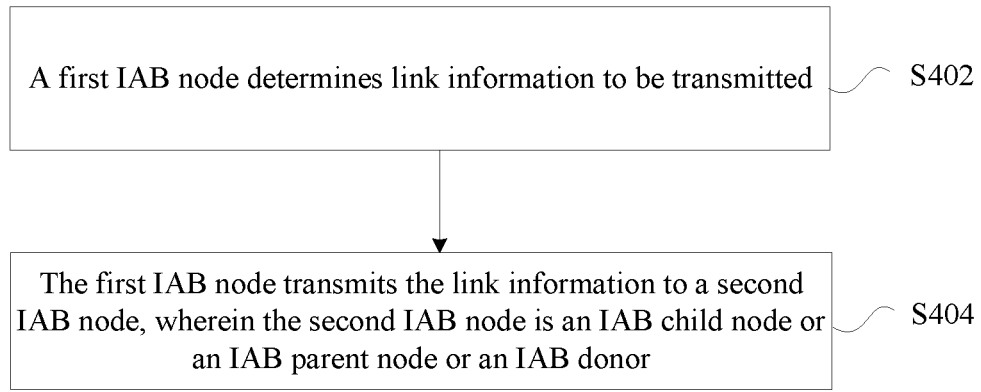
FIG. 4 is a flowchart of an information transmission method according to an embodiment of the present disclosure.

The information transmission method implemented based on the above network architecture is provided in the embodiment. FIG. 4 is a flowchart of an information transmission method according to an embodiment of the present disclosure. As shown in FIG. 4, the process may include the following operations.

At S402, a first IAB node determines link information to be transmitted.

At S404, the first IAB node transmits the link information to a second IAB node, wherein the second IAB node is an IAB child node or an IAB parent node or an IAB donor.

The IAB child node may also be referred to as a child IAB node.

The IAB parent node may also be referred to as a parent IAB node.

The IAB donor may also be referred to as an IAB host.

The second IAB node may also be a previous hop of node, or an intermediate hop of node from which a data packet can reach the IAB donor after the forwarding of multiple hops of nodes.

By means of the above operations, the first IAB node transmits the link information to the second IAB node, wherein the second IAB node is the IAB parent node or the IAB donor. With the adoption of the above technical solution, the problem that there is no link information reporting solution suitable for an IAB scenario in NR in the relevant art is solved, and the link information can be reported in the IAB scenario timely and accurately.

In exemplary implementations of the present embodiment, execution sequences of the operations S402 and S404 may be interchangeable, i.e., the operation S404 may be executed first, and then the operation S402 is executed.

In exemplary implementations of the present embodiment, the link information includes at least one of the followings: flow control information; highest delivered Packet Data Convergence Protocol Sequence Number (PDCP SN) information; link state information; and transmission state information of a data packet.

In exemplary implementations of the present embodiment, the flow control information includes at least one of the followings:

one or more bearer Identifiers (IDs), wherein the bearer may be a bearer of a UE, or a bearer of an IAB node;

one or more Logical Channel IDs (LCIDs), wherein the logical channel may be a logical channel of the UE, or a logical channel of the IAB node;

UE ID information or IAB node ID information; and desired buffer size information.

In exemplary implementations of the present embodiment, the desired buffer size information includes at least one of the followings: a desired buffer size corresponding to the bearer or logical channel of the UE; a desired buffer size corresponding to the bearer or logical channel of the IAB node; a desired buffer size corresponding to the UE or the IAB node; and a minimum desired buffer size corresponding to the UE or the IAB node.

In exemplary implementations of the present embodiment, the link state information includes at least one of the followings:

information indicating radio link failure;

information indicating radio link interruption;

information indicating radio link restoration; and node ID information for identifying an IAB node corresponding to a reported link state, i.e., the IAB node ID information which reports the link state information may be carried in the link state information.

Figure 6:
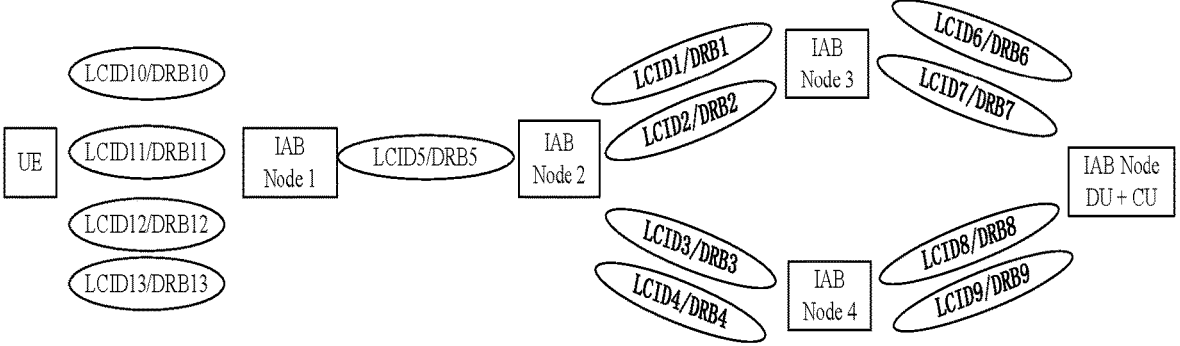
FIG. 6 is a schematic diagram of a network architecture according to Exemplary Embodiment 2 of the present disclosure.

The solution in the embodiment may be understood with reference to FIG. 6, for example, the IAB node 2 may report the radio link state of the Data Radio Bearer (DRB) 5 while reporting the link state information to the IAB node 3 or the IAB node 4.

In exemplary implementations of the present embodiment, the transmission state information of the data packet includes one of the followings: SN information of a lost data packet; SN information of an unsuccessfully transmitted data packet; and SN information of an unconfirmed data packet.

In exemplary implementations of the present embodiment, the node ID information may be a first ID for identifying an MT portion of the IAB node. The first ID includes, but is not limited to, at least one of: a Cell Radio Network Temporary Identifier (C-RNTI); C-RNTI+ cell ID; C-RNTI+base station ID; C-RNTI+DU ID; an F1AP ID; an X2AP ID; an XnAP ID; an S1AP ID; an NGAP ID; and a General Packet Radio Service Tunneling Protocol Tunnel End point Identifier (GTP TEID).

Alternatively, the node ID information may be a second ID for identifying the following information: a DU of the IAB node; a CU of the IAB node; and a base station portion of the IAB node. The second ID includes, but is not limited to, at least one of: a DU ID, a CU ID, a base station ID, a cell ID, a Physical Cell Identifier (PCI), and an Internet Protocol (IP) address.

The description on the node ID information also applies for other embodiments in the present disclosure.

In exemplary implementations of the present embodiment, when the second IAB node is the IAB donor, the operation that the IAB node transmits the link information to the second IAB node may include that: the IAB node transmits the link information to the IAB donor through one or more other IAB nodes, wherein the IAB donor is a DU of the IAB donor and/or a CU of the IAB donor. The one or more other nodes in the embodiment may be ambient IAB nodes, or a part of IAB nodes in multiple hops of nodes.

In exemplary implementations of the present embodiment, the operation that the IAB node transmits the link information to the second IAB node may be implemented in one of the following manners.

The IAB node transmits the link information to the second IAB node by including the link information in a GTP-U packet header.

The IAB node transmits the link information to the second IAB node through a Media Access Control (MAC) layer.

The IAB node transmits the link information to the second IAB node by including the link information in an adaptation layer packet header.

The IAB node transmits the link information to the second IAB node through an F1 message.

The IAB node transmits the link information to the second IAB node through a Radio Resource Control (RRC) message.

According to another embodiment of the present disclosure, another information transmission method is provided, which may include the following operation.

A second IAB node receives link information transmitted by an IAB node, wherein the second IAB node is an IAB child node or an IAB parent node or an IAB donor.

With the adoption of the above technical solution, the problem that there is no link information reporting solution suitable for an IAB scenario in NR in the relevant art is solved, and the link information can be reported in the IAB scenario timely and accurately.

In exemplary implementations of the present embodiment, the link information includes at least one of the followings: flow control information; highest delivered PDCP SN information; and link state information.

Figure 1:
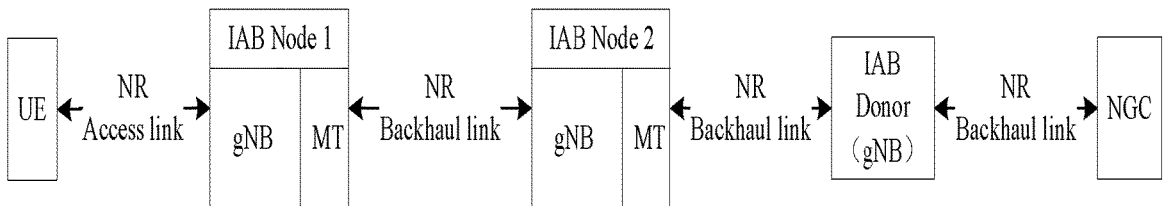
FIG. 1 is a schematic diagram of an IAB scenario in which a CU/DU is not separately deployed according to the relevant art.
Figure 2:
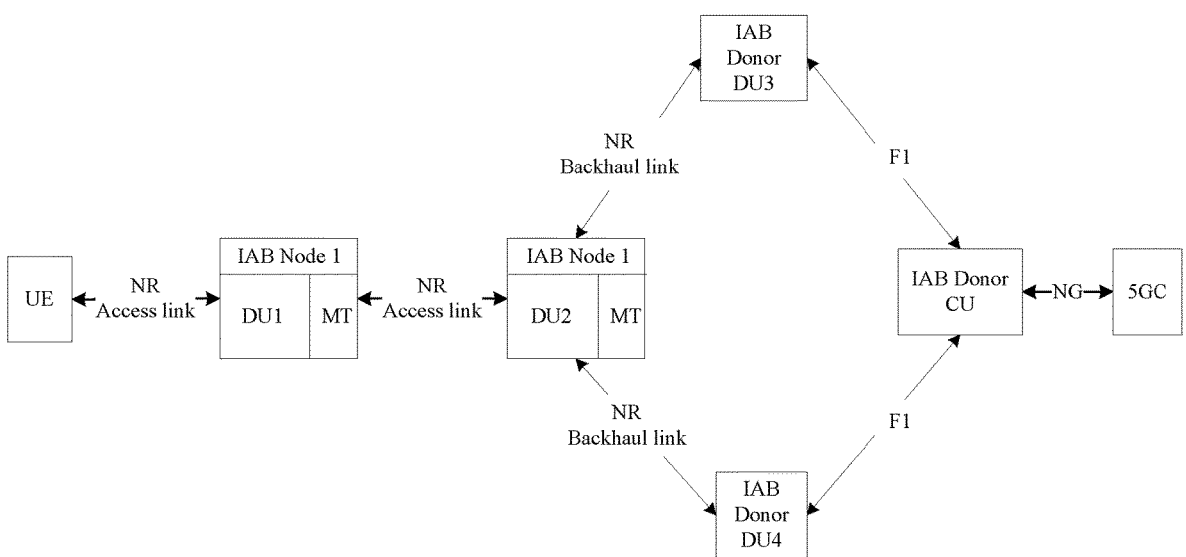
FIG. 2 is a schematic diagram of an IAB scenario in which a CU/DU is separately deployed according to the relevant art.

In an embodiment, the 5GC in FIG. 2 denotes a 5G core network, and both the F1 and the NG in FIG. 2 are interfaces.

The disclosure will be described below based on another embodiment of the present disclosure.

Exemplary Embodiment 1

The problem to be solved by the embodiments of the present disclosure is a flow control method in the IAB architecture such that a data packet can be successfully transmitted.

Figure 5:
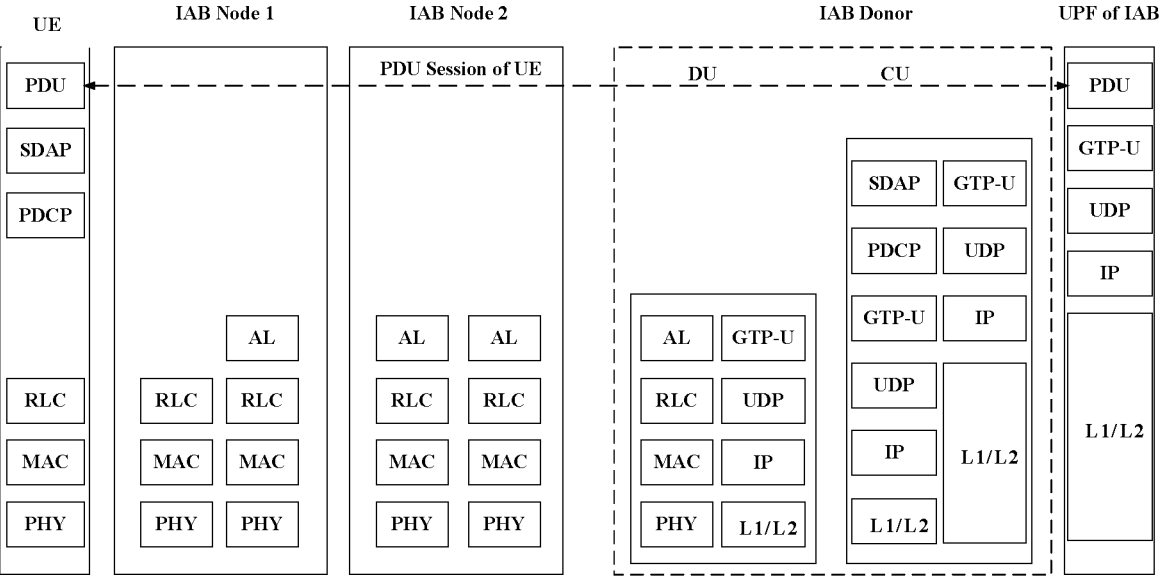
FIG. 5 is a schematic diagram of a protocol stack used by an IAB UP according to the embodiments of the present disclosure.

FIG. 5 is a schematic diagram of a protocol stack used by an IAB UP according to the embodiments of the present disclosure. As illustrated in FIG. 5, there is no GTP-U protocol layer provided between the IAB node and the donor DU, but there is a GTP-U protocol layer provided between the donor DU and the donor CU. In FIG. 5, the adaptation layer is located above the Radio Link Control (RLC) layers of the IAB node and the IAB donor DU. It is to be noted that the adaptation layer (also referred to as adaptor layer) may also be located between the RLC layer and the MAC layer, or the adaptation layer can also be located on the RLC or MAC layer. The adaptation layer may also be provided on the interface between the DU and the CU (or CU-UP) of the Donor, i.e., the DU and the CU (or CU-UP) of the Donor may also execute the corresponding adaption layer processing. In addition, there may further be GTP-U or UDP or IP layer provided above the adaptation layer in FIG. 5. It is to be noted that the method of the embodiments of the present disclosure is not merely limited to the use on the schematic IAB protocol stack architecture provided in the description, and may also be applied to other IAB protocol stack architectures. The embodiment illustrates the method for transmitting the flow control information in a case where no GTP-U protocol layer is provided on the IAB node. In FIG. 5, the PHY denotes a physical layer, the L1 denotes a physical layer in the protocol stack model, the L2 denotes a link layer in the protocol stack model, and the Service Data Adaptation Protocol (SDAP) denotes an SDAP layer.

The IAB node may transmit the flow control information to a next hop of node (parent IAB node or IAB donor). For example, under the IAB protocol stack architecture shown in FIG. 5, the IAB node 1 may transmit the flow control information to the IAB node 2. The IAB node 2 may transmit the flow control information to the IAB donor DU. In some exemplary implementation, the flow control information at least includes one of the followings:

1) one or more bearer IDs, wherein the bearer ID may be an ID of a bearer of the UE or an ID of a bearer of the IAB node;

2) one or more LCIDs, wherein the LCID may be an ID of a logical channel of the UE, or an ID of a logical channel of the IAB node;

3) a desired buffer size corresponding to the bearer or the logical channel of the UE;

4) a desired buffer size corresponding to the bearer or the logical channel of the IAB node;

5) a desired buffer size corresponding to the UE or the IAB node;

6) a minimum desired buffer size corresponding to the UE or the IAB node; and

7) UE ID information or IAB node ID information. The IAB node ID information is an ID for identifying an MT portion of the IAB node, including but not limited to at least one of: a C-RNTI, C-RNTI+cell ID, C-RNTI+base station ID, C-RNTI+DU ID, an F1AP ID, an X2AP ID, and a GTP TEID; or, an ID for identifying a DU or CU or base station portion of the IAB node, including but not limited to at least one of: a DU ID, a CU ID, a base station ID, a cell ID, a PCI, and an IP address.

The flow control information may be transmitted in the following manners.

Manner 1: The Flow Control Information is Transmitted Through the MAC Layer

In the manner for transmitting the flow control information through the MAC layer, the flow control information may be transmitted through an MAC Control Element (CE), for example, the MAC CE may include one piece of buffer size information and/or corresponding one or more bearer IDs/LCIDs; or, may include multiple pieces of buffer size information and/or one or more bearer IDs/LCIDs corresponding to each piece of buffer size information. Or, the MAC CE may include one piece of buffer size information and/or a corresponding UE ID or IAB node ID; or, may include multiple pieces of buffer size information and/or a UE ID or IAB node ID corresponding to each piece of buffer size information. One MAC Protocol Data Unit (PDU) may include one or more MAC CEs for transmitting the flow control information. In exemplary implementations of the present embodiment, the MAC PDU includes an LCID corresponding to an MAC CE for transmitting the flow control information.

Manner 2: The Flow Control Information is Transmitted Through the Adaptation Layer In the manner for transmitting the flow control information through the adaptation layer, the adaptation layer packet header may include one piece of buffer size information and/or corresponding one or more bearer IDs/LCIDs; or, may include multiple pieces of buffer size information and/or one or more bearer IDs/LCIDs corresponding to each piece of buffer size information. Or, the adaptation layer packet header may include one piece of buffer size information and/or a corresponding UE ID or IAB node ID; or, may include multiple pieces of buffer size information and/or a UE ID or IAB node ID corresponding to each piece of buffer size information.

Manner 3: The Flow Control Information is Transmitted Through the F1 Message

Manner 4: The Flow Control Information is Transmitted Through the RRC Message

In exemplary implementations of the present embodiment, upon the reception of flow control information from a previous hop of node, the IAB node 2 or the IAB donor DU may carry out downlink data transmission according to the flow control information.

Or, upon the reception of flow control information from the previous hop of node, the IAB node 2 forwards the flow control information to a next hop of node. In exemplary implementations of the present embodiment, the Donor DU may transmit the flow control information through the GTP-U. Upon the reception of the flow control information, the IAB donor DU or the IAB donor CU may carry out the downlink data transmission according to the flow control information.

Exemplary Embodiment 2

The following description is made for one example for transmitting the flow control information. The example may be applied to various IAB protocol stack architectures. FIG. 6 is a schematic diagram of a network architecture according to Exemplary Embodiment 2 of the present disclosure. As illustrated in FIG. 6, the logical channels/bearers 10, 11, 12 and 13 are respectively mapped with the logical channel/bearer 5, the logical channel/bearer 5 is mapped with the logical channels/bearers 1, 2, 3 and 4 respectively, the logical channel/bearer 1 is mapped with the logical channel/bearer 6, the logical channel/bearer 2 is mapped with the logical channel/bearer 7, the logical channel/bearer 3 is mapped with the logical channel/bearer 8, and the logical channel/bearer 4 is mapped with the logical channel/bearer 9.

The IAB node 1 determines, according to its own buffer condition, desired buffer sizes respectively corresponding to the logical channels/bearers 10, 11, 12 and 13, adds the desired buffer sizes to obtain a desired buffer size corresponding to the logical channel/bearer 5, and/or, a desired buffer size corresponding to the IAB node 1 (MT portion), and transmits the flow control information through an adaptation layer or an MAC layer or an F1 message or an RRC message in a data packet of the logical channel/bearer 5.

The IAB node 2 determines, according to its own buffer condition, a desired buffer size corresponding to the logical channel/bearer 5, and may use either of the following two manners to transmit the flow control information.

Manner 1: the IAB node 2 further determines the desired buffer size corresponding to each logical channel/bearer (1, 2, 3 and 4) between the IAB node 2 and the IAB node 3/4, and respectively transmits the desired buffer sizes to the IAB node 3 and the IAB node 4 through the data packets in the logical channel/bearers 1, 2, 3 and 4. In exemplary implementations of the present embodiment, the IAB node 2 adds the desired buffer sizes corresponding to the logical channels/bearers 1 and 2 as the desired buffer size of the MT portion of the IAB node 2, and transmits the desired buffer size to the IAB node 3 through the data packet in the logical channel/bearer 1 or 2. In exemplary implementations of the present embodiment, the IAB node 2 adds the desired buffer sizes corresponding to the logical channels/bearers 3 and 4 as the desired buffer size of the MT portion of the IAB node 2, and transmits the desired buffer size to the IAB node 4 through the data packet in the logical channel/bearer 3 or 4.

Manner 2: the IAB node 2 further determines a total desired buffer size corresponding to one or more logical channels/bearers between the IAB node 2 and the IAB node 3, and transmits the total desired buffer size to the IAB node 3 through the data packet in the logical channel/bearer 1 or 2. The IAB node 2 further determines a total desired buffer size corresponding to one or more logical channels/bearers between the IAB node 2 and the IAB node 4, and transmits the total desired buffer size to the IAB node 3 through the data packet in the logical channel/bearer 3 or 4.

Exemplary Embodiment 3

Figure 7:
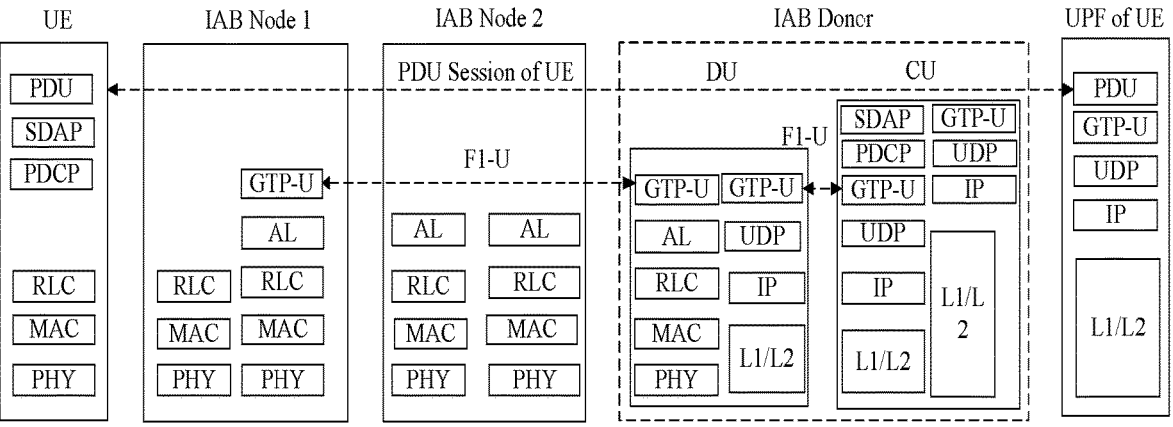
FIG. 7 is a schematic diagram of a protocol stack architecture of an IAB UP according to Exemplary Embodiment 3 of the present disclosure.

One example for the protocol stack architecture of the IAB UP is as shown in FIG. 7. FIG. 7 is a schematic diagram of a protocol stack architecture of an IAB UP according to Exemplary Embodiment 3 of the present disclosure. As illustrated in FIG. 7, the GTP-U protocol layer is provided between the IAB node and the IAB donor. The adaptation layer is located above the RLC layers of the IAB node and the IAB donor. It is to be noted that the adaptation layer (or adaptor layer) may alternatively be located between the RLC layer and the MAC layer, or the adaptation layer may be located on the RLC or MAC layer. The adaptation layer may also be provided on the interface between the DU and the CU (or CU-UP) of the Donor, i.e., the DU and the CU (or CU-UP) of the Donor also execute the corresponding adaptation layer processing. In addition, a User Datagram Protocol (UDP) or an Internet Protocol (IP) layer may be provided under the GTP-U layer in FIG. 7. Besides, the GTP-U protocol layer may not be provided on the donor DU in FIG. 7. It is to be noted that the method of the embodiments of the present disclosure is not limited to be used on the exemplary IAB protocol stack architecture in the description, and may also be applied to other IAB protocol stack architectures. The embodiment illustrates the method for transmitting the flow control information in a case where the GTP-U protocol layer is provided on the IAB node.

In the method of the embodiment, the IAB node (such as the IAB node 1 and the IAB node 2 in FIG. 7) may transmit the flow control information in the manner in Embodiments 1 and 2; or, the IAB node may alternatively transmit the flow control information through the GTP-U protocol layer. Specifically, the flow control information at least includes one of the followings:

1) one or more bearer IDs, wherein the bearer ID may be an ID of a bearer of the UE or an ID of a bearer of the IAB node;

2) one or more LCIDs, wherein the LCID may be an ID of a logical channel of the UE, or an ID of a logical channel of the IAB node;

3) a desired buffer size corresponding to the bearer or the logical channel of the UE;

4) a desired buffer size corresponding to the bearer or the logical channel of the IAB node;

5) a desired buffer size corresponding to the UE or the IAB node;

6) a minimum desired buffer size corresponding to the UE or the IAB node; and

7) UE ID information or IAB node ID information. The IAB node ID information is an ID for identifying an MT portion of the IAB node, including but not limited to: a C-RNTI, C-RNTI+ cell ID, C-RNTI+base station ID, C-RNTI+DU ID, an F1AP ID, an X2AP ID, and a GTP TEID. Or, The IAB node ID information is an ID for identifying a DU or CU or base station portion of the IAB node, including but not limited to: a DU ID, a CU ID, a base station ID, a cell ID, a PCI, and an IP address.

Or, the IAB node may transmit the flow control information through the F1 message, or the RRC message.

In exemplary implementations of the present embodiment, upon the reception of flow control information of a previous hop of node, the IAB node 2 or the IAB donor DU may carry out downlink data transmission according to the flow control information.

Or, upon the reception of flow control information of the previous hop of node, the IAB node 2 forwards the flow control information to a next hop of node. In exemplary implementations of the present embodiment, the Donor DU may transmit the flow control information through the GTP-U. Upon the reception of the flow control information, the IAB donor DU or the IAB donor CU may carry out the downlink data transmission according to the flow control information.

Exemplary Embodiment 4

The embodiment illustrates a method for transmitting link information by the IAB node. The method in the embodiment can be applied to various IAB protocol stack architectures.

The IAB node may transmit the link information to a next hop of node (parent IAB node or IAB donor). The next hop of node may forward the link information upon the reception of the link information. The link information transmitted by the IAB node may be transmitted to the IAB donor through one hop forwarding or multi-hop forwarding. Or, the IAB node may transmit the link information to a child IAB node. The link information may be transmitted through the method in Embodiments 1, 2 and 3. Specifically, the link information at least includes one of the followings:

1) highest delivered PDCP SN information;

2) link state information; and 3) transmission state information of a data packet.

The link state information may include one of the followings:

1) information indicating radio link failure;

2) information indicating radio link interruption;

3) information indicating radio link restoration; and

4) ID information for identifying an IAB node corresponding to a reported link state.

In exemplary implementations of the present embodiment, the link state information may be indicated by a cause value field.

The transmission state information of the data packet may include one of the followings:

1) SN information of a lost data packet;

2) SN information of an unsuccessfully transmitted data packet; and

3) SN information of an unconfirmed data packet.

In exemplary implementations of the present embodiment, the SN of the data packet may be a PDCP SN or an RLC SN or a newly-defined SN of the data packet.

In exemplary implementations of the present embodiment, upon the reception of the highest delivered PDCP SN information, the child IAB node or the next hop of node or the IAB donor carries out PDCP buffer releasing.

In exemplary implementations of the present embodiment, upon the reception of the link state information, the child IAB node or the next hop of node or the IAB donor may determine, according to the link state information, a path used for transmission of the data packet.

In exemplary implementations of the present embodiment, upon the reception of the transmission state information of the data packet, the child IAB node or the next hop of node or the IAB donor may determine an SN of a data packet in need of being transmitted or retransmitted.

By means of the above-mentioned descriptions on the implementation manner, the person skilled in the art may clearly understand that the scheme in the embodiments of the present disclosure may be implemented by software plus a necessary general-purpose hardware platform, and may alternatively be implemented by hardware certainly, but under most conditions, the former is a better implementation manner. Based on such an understanding, the essence of the technical solutions of the embodiments of the present disclosure or the parts of the technical solutions of the embodiments of the present disclosure making contributions to the relevant art may be embodied in the form of software product, and the computer software product may be stored in a storage medium (such as a Read-Only Memory (ROM)/ Random Access Memory (RAM), a magnetic disk and an optical disc), including a plurality of instructions configured to enable a terminal device (which may be a mobile phone, a computer, a server, network equipment or the like) to execute the method in each embodiment of the present disclosure.

Embodiment 2

The embodiment provides an information transmission device for implementing the above-mentioned embodiments and exemplary implementation manners. The content that has been described will no longer be repeated. As used below, the term "module" refers to a combination of software and/or hardware having a predetermined function. Although the device described in the following embodiments is implemented by software preferably, the implementation of hardware or a combination of the software and the hardware may also be conceivable.

According to an embodiment of the present disclosure, an information transmission device is provided, which may be applied to an IAB node, and may include: a first determination module, and a first transmitting module.

The first determination module is configured to determine link information to be transmitted to a second IAB node.

The first transmitting module is configured to transmit the link information to the second IAB node, wherein the second IAB node is an IAB child node or an IAB parent node or an IAB donor.

By adopting the technical solution, the IAB node transmits the link information to the second IAB node, wherein the second IAB node is the IAB parent node or the IAB donor. With the adoption of the above technical solution, the problem that there is no link information reporting solution suitable for an IAB scenario in NR in the relevant art is solved, and the link information can be reported in the IAB scenario timely and accurately.

In exemplary implementations of the present embodiment, the link information includes at least one of the followings: flow control information; highest delivered PDCP SN information; and link state information.

In exemplary implementations of the present embodiment, the flow control information includes at least one of the followings: one or more bearer IDs; one or more LCIDs; UE ID information or IAB node ID information; and desired buffer size information.

In exemplary implementations of the present embodiment, the desired buffer size information includes at least one of the followings: a desired buffer size corresponding to the bearer or logical channel of the UE; a desired buffer size corresponding to the bearer or logical channel of the IAB node; a desired buffer size corresponding to the UE or the IAB node; and a minimum desired buffer size corresponding to the UE or the IAB node.

In exemplary implementations of the present embodiment, the link state information at least include one of the followings: information indicating radio link failure; information indicating radio link interruption; information indicating radio link restoration; and node ID information for identifying an IAB node corresponding to a reported link state.

In exemplary implementations of the present embodiment, the node ID information is a first ID for identifying an MT portion of the IAB node. The first ID includes one of the followings: a C-RNTI; C-RNTI+ cell ID; C-RNTI+base station ID; C-RNTI+DU ID; an F1AP ID; an X2AP ID; and a GTP TEID.

Or, the node ID information is a second ID for identifying the following information: a DU of the IAB node; a CU of the IAB node; and a base station portion of the IAB node. The second ID includes one of the followings: a DU ID, a CU ID, a base station ID, a cell ID, a PCI, and an IP address.

In exemplary implementations of the present embodiment, the first transmitting module is further configured to transmit the link information to the IAB donor through one or more other IAB nodes. The IAB donor is a DU of the IAB donor and/or a CU of the IAB donor.

In exemplary implementations of the present embodiment, the first transmitting module is further configured to execute one of the following operations.

The first transmitting module transmits the link information to the second IAB node by including the link information in a GTP-U packet header.

The first transmitting module transmits the link information to the second IAB node through an MAC layer.

The first transmitting module transmits the link information to the second IAB node by including the link information in an adaptation layer packet header.

The first transmitting module transmits the link information to the second IAB node through an F1 message.

The first transmitting module transmits the link information to the second IAB node through an RRC message.

It is to be noted that each module may be implemented by software or hardware. The later may be implemented via the following manner but is not limited thereto: the above modules are located in the same processor; or the above modules are respectively located in different processors in any combined form.

Embodiment 3

The embodiment of the present disclosure provides a storage medium. Optionally, in this embodiment, the storage medium may be configured to store a program code for executing the following operations:

At S1, an IAB node determines link information to be transmitted.

At S2, the IAB node transmits the link information to a second IAB node, wherein the second IAB node is an IAB child node or an IAB parent node or an IAB donor.

Optionally, in this embodiment, the storage medium may include but not limited to: various media capable of storing a program code such as a U disk, an ROM, an RAM, a mobile hard disk, a magnetic disk or an optical disc.

An embodiment of the present disclosure provides an electronic device, which may include a memory and a processor; the memory stores a computer program; and the processor is configured to run the computer program to execute the operations of any of the above-mentioned method embodiments.

In exemplary implementations of the present embodiment, the electronic device may further include a transmission device and an input-output device. The transmission device is connected to the processor. The input-output device is connected to the processor.

Optionally, in the embodiment, the processor may be configured to execute the following operations through the computer program.

At S1, an IAB node determines link information to be transmitted.

At S2, the IAB node transmits the link information to a second IAB node, wherein the second IAB node is an IAB child node or an IAB parent node or an IAB donor.

Optionally, the specific example in this embodiment may be referred to the examples described in the above embodiments and exemplary implementation manners, and will no longer be repeated herein.

It is apparent that those skilled in the art should understand that the above-mentioned operations of the present disclosure may be implemented by a general-purpose computing device, and they may be centralized on a single computing device or distributed on a network composed of multiple computing devices. Optionally, they may be implemented with program codes executable by a computing device, so that they may be stored in a storage device and executed by the computing device, and in some cases, the operations shown or described may be performed in a different order than here, or they are separately made into individual integrated circuit modules, or multiple operations therein are made into a single integrated circuit module for implementation. By doing so, the present disclosure is not limited to any specific combination of hardware and software.

We claim:

1. An information transmission method of an Integrated Access and Backhaul (IAB) link, comprising:
transmitting, by a first IAB node of the IAB link, link information identifying a channel of a plurality of channels of the first IAB node to a second IAB node of the IAB link via a logical channel between the first IAB node and the second IAB node,
wherein:
the second IAB node is an IAB parent node that is a hop away from the first IAB node,
the link information comprises flow control information for the channel of the plurality of channels, and
the flow control information comprises buffer size information for the logical channel between the first IAB node and the second IAB node.

2. The information transmission method as claimed in claim 1, wherein the flow control information comprises a Logical Channel identifier (LCID).

3. The information transmission method as claimed in claim 2, wherein the buffer size information comprises a buffer size corresponding to a logical channel of the first IAB node.

4. An information transmission method of an Integrated Access and Backhaul (IAB) link, comprising:

receiving, by a second IAB node of the IAB link from a first IAB node of the IAB link, link information identifying a channel of a plurality of channels of the first IAB node via a logical channel between the first IAB node and the second IAB node, wherein:

the second IAB node is an IAB parent node that is a hop away from the first IAB node, the link information comprises flow control information for the channel of the plurality of channels, and the flow control information comprises buffer size information for the logical channel between the first IAB node and the second IAB node.

5. The information transmission method as claimed in claim 4, wherein the flow control information comprises a Logical Channel identifier (LCID).

6. The information transmission method as claimed in claim 5, wherein the buffer size information comprises a buffer size corresponding to a logical channel of the first IAB node.

7. A first Integrated Access and Backhaul (IAB) node of a IAB link, comprising:

at least one processor configured to:

transmit, via a transmitter, link information identifying a channel of a plurality of channels of the first IAB node to a second IAB node of the IAB link via a logical channel between the first IAB node and the second IAB node, wherein:

the second IAB node is an IAB parent node that is a hop away from the first IAB node, the link information comprises flow control information for the channel of the plurality of channels, and the flow control information comprises buffer size information for the logical channel between the first IAB node and the second IAB node.

8. The first IAB node as claimed in claim 7, wherein the flow control information comprises a Logical Channel identifier (LCID).

9. The first IAB node as claimed in claim 8, wherein the buffer size information comprises a buffer size corresponding to a logical channel of the first IAB node.

10. A second Integrated Access and Backhaul (IAB) node of a IAB link, comprising:

at least one processor configured to:

receive, via a receiver from a first IAB node of the IAB link, link information identifying a channel of a plurality of channels of the first IAB node via a logical channel between the first IAB node and the second IAB node, wherein:

the second IAB node is an IAB parent node that is a hop away from the first IAB node, the link information comprises flow control information for the channel of the plurality of channels, and the flow control information comprises buffer size information for the logical channel between the first IAB node and the second IAB node.

11. The second IAB node as claimed in claim 10, wherein the flow control information comprises a Logical Channel identifier (LCID).

12. The second IAB node as claimed in claim 11, wherein the buffer size information comprises a buffer size corresponding to a logical channel of the first IAB node.

* * * * *